(12) United States Patent
Burke

(10) Patent No.: US 8,975,765 B2
(45) Date of Patent: Mar. 10, 2015

(54) SYSTEM FOR GENERATING ELECTRICITY FROM ARENA SEATING

(76) Inventor: William Patrick Burke, Oyster Bay, NY (US)

(*) Notice: Subject to any disclaimer, the term of this patent is extended or adjusted under 35 U.S.C. 154(b) by 260 days.

(21) Appl. No.: 13/306,829

(22) Filed: Nov. 29, 2011

(65) Prior Publication Data

US 2012/0146340 A1    Jun. 14, 2012

Related U.S. Application Data

(60) Provisional application No. 61/417,836, filed on Nov. 29, 2010.

(51) Int. Cl.
*F03G 7/08* (2006.01)

(52) U.S. Cl.
CPC .......................... *F03G 7/08* (2013.01)
USPC ......................... 290/1 R; 297/217.3

(58) Field of Classification Search
CPC ................. B62J 6/06; B62J 1/06; B62J 1/28; H02K 7/1853; H02K 7/1876; A47C 1/0242; A47C 11/005; F03G 7/08
See application file for complete search history.

(56) References Cited

U.S. PATENT DOCUMENTS

| | | |
|---|---|---|
| 4,032,829 A | 6/1977 | Schenavar |
| 4,933,618 A | 6/1990 | Ortlieb |
| 5,329,716 A | 7/1994 | Fite |
| 5,523,664 A | 6/1996 | Ogasawara |
| 5,893,608 A | 4/1999 | Cravenor |
| 5,944,384 A | 8/1999 | Patterson |
| 5,975,630 A | 11/1999 | Schreiber |
| 6,000,353 A | 12/1999 | De Leu |
| 6,179,381 B1 * | 1/2001 | Gevaert ..................... 297/217.3 |
| 6,229,224 B1 | 5/2001 | Gagne |
| 6,236,118 B1 | 5/2001 | Vasija et al. |
| 6,749,257 B2 | 6/2004 | Müller |
| 6,855,016 B1 | 2/2005 | Jansen |
| 6,870,477 B2 | 3/2005 | Gruteser et al. |
| 7,555,766 B2 * | 6/2009 | Kondo et al. ................... 725/12 |
| 7,989,970 B2 * | 8/2011 | Yeh ................ 290/1 C |
| 8,016,351 B2 * | 9/2011 | Cassaday .................. 297/217.1 |
| 8,053,912 B2 * | 11/2011 | Goh et al. ...................... 290/1 R |
| 8,564,144 B1 * | 10/2013 | Rome et al. ................... 290/1 C |
| 8,598,721 B2 * | 12/2013 | Baarman et al. .............. 290/1 R |
| 2001/0045763 A1 | 11/2001 | Jacoway |
| 2004/0160059 A1 | 8/2004 | Pandian |
| 2005/0242635 A1 | 11/2005 | Cassaday |
| 2009/0174243 A1 | 7/2009 | Nathan et al. |
| 2009/0256363 A1 | 10/2009 | Okamoto |
| 2010/0026142 A1 * | 2/2010 | Jones et al. ................... 310/339 |
| 2010/0219720 A1 | 9/2010 | Namuduri et al. |
| 2010/0327603 A1 | 12/2010 | Suaan |

* cited by examiner

*Primary Examiner* — Michael Zarroli
(74) *Attorney, Agent, or Firm* — Daniel P. Burke & Associates, PLLC

(57) ABSTRACT

A system which generates electricity from the movement of at least a portion of a seat in an arena and, preferably, combines electricity generated by the movement of a plurality of seats to create usable quantities of electrical energy.

16 Claims, 5 Drawing Sheets

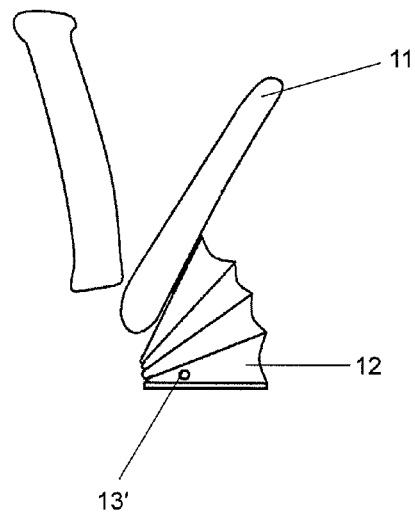
FIG. 2
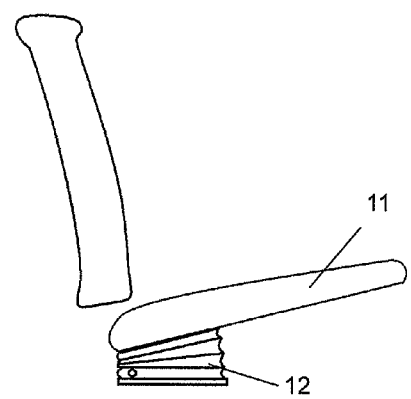
FIG. 3
FIG. 5
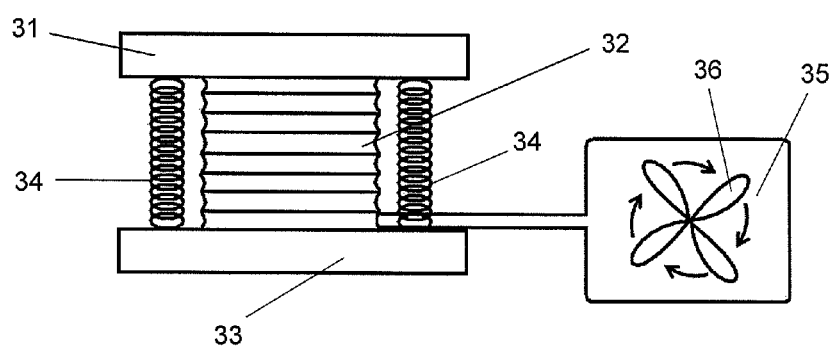

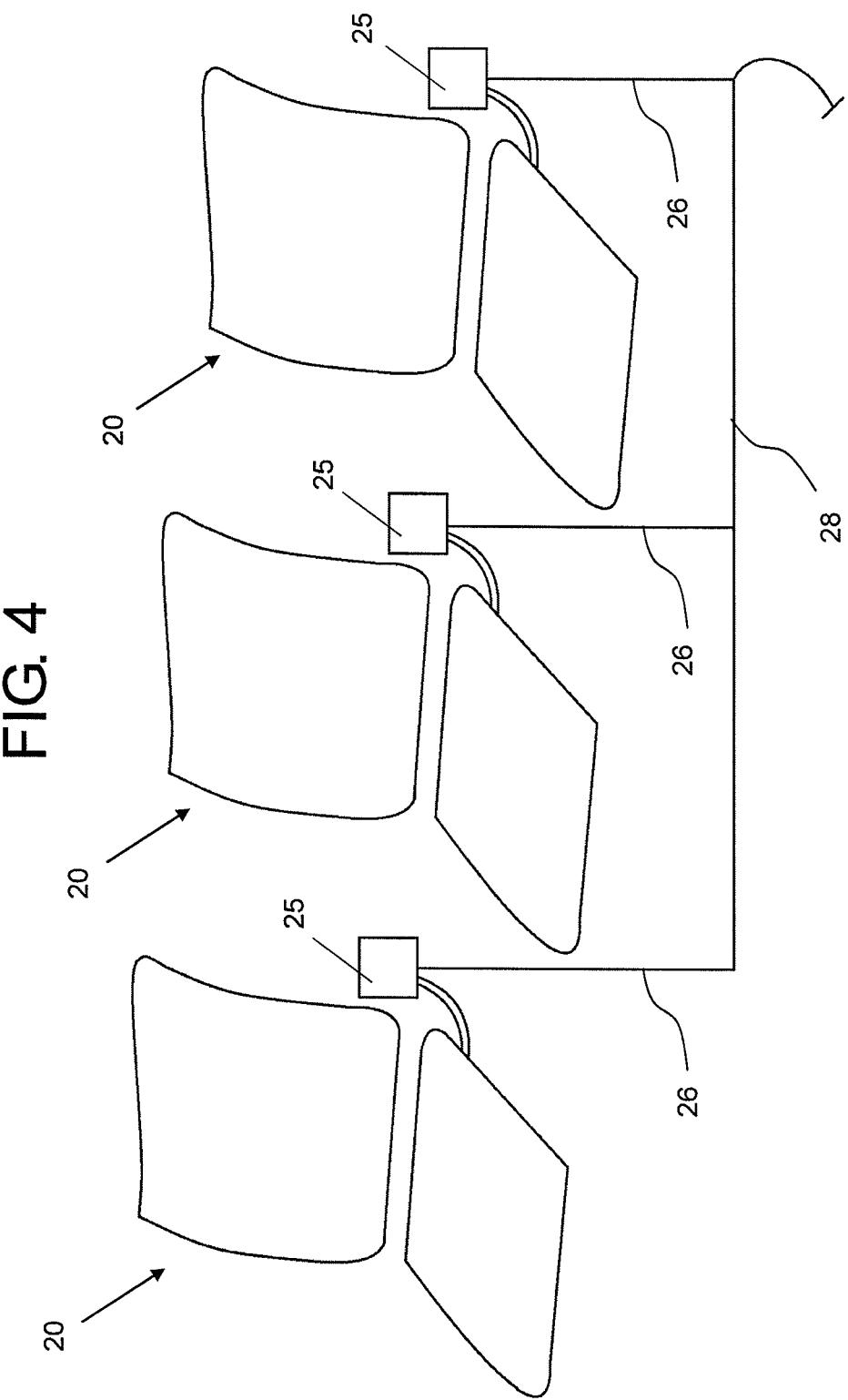

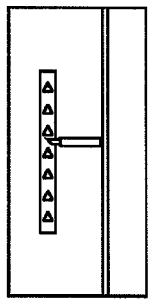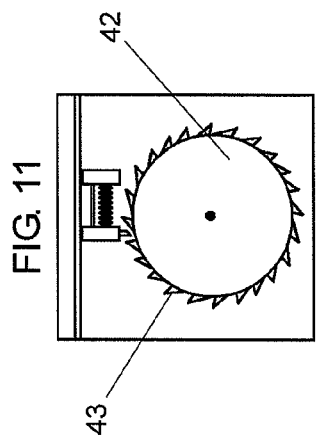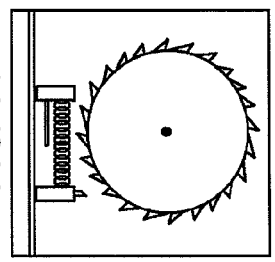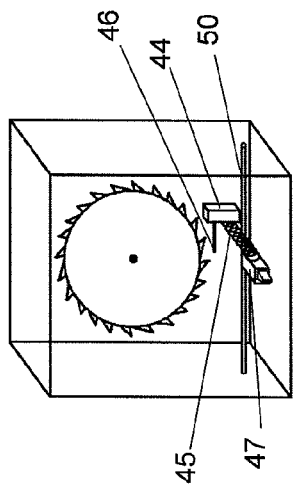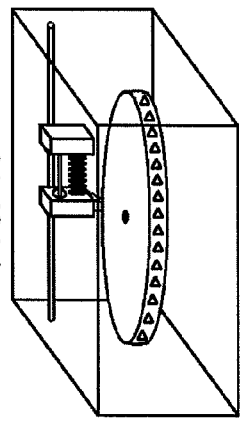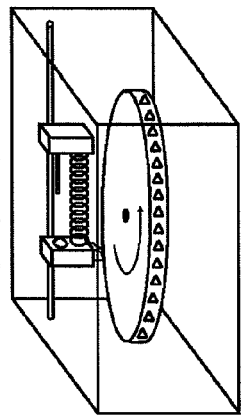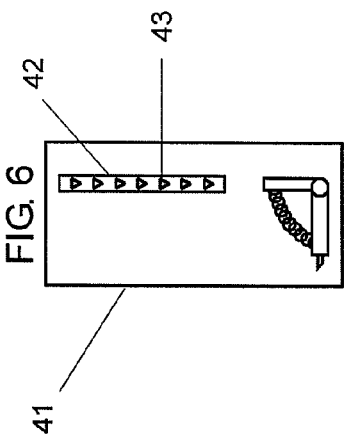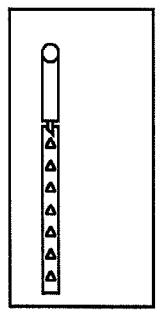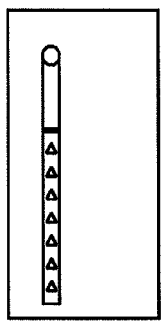

SYSTEM FOR GENERATING ELECTRICITY FROM ARENA SEATING

CLAIM OF PRIORITY

This application claims priority on U.S. Provisional Patent Application Ser. No. 61/417,836 on Nov. 29, 2010.

BACKGROUND OF THE INVENTION

The present invention is directed to a system, e.g. an entertainment system, which generates electricity from the movement of at least a portion of a seat in an arena and, preferably, combines electricity generated by the movement of a plurality of seats to create usable quantities of electrical energy.

SUMMARY OF THE INVENTION

As a person sits down in a seat there is typically wasted energy. This energy that is typically wasted is turned into usable electrical energy by utilizing forces acting on the seat. When a seat is turned/lowered, only a small amount of electrical energy will be generated, however, when thousands of seats are generating energy, such as in a stadium, a more significant amount of electrical energy will be generated. The various embodiments of the present invention generate electricity from the movement of at least a portion of a seat in an arena and, preferably, combines electricity generated by the movement of a plurality of seats to create usable quantities of electrical energy.

BRIEF DESCRIPTION

FIG. 2 illustrates a side view of one of the seats of FIG. 1 with a base in a raised position.

FIG. 3 illustrates a side view of one of the seats of FIG. 1 with a base in a lowered position.

FIG. 4 illustrates a plurality of seats according to a second embodiment of the present invention.

FIG. 5 illustrates a single base of a seat according to a third embodiment of the present invention.

FIGS. 6-8 are side, front perspective and top views, respectively, of a base of a fourth embodiment of the present invention with the base in a raised position.

FIGS. 9-11 are side, front perspective and top views, respectively, of a base of a fourth embodiment of the present invention with the base in a lowered position.

FIGS. 12-14 are side, front perspective and top views, respectively, of a base of a fourth embodiment of the present invention with the base in a lowered position and a spring which has been tripped.

DETAILED DESCRIPTION

When a person sits down, almost all of their weight from their knees up is applied downwardly. For purposes of illustration, if an average person has a weight of 177 pounds, after subtracting their weight below their knees, for present purposes estimated to be 37 pounds, the upper 140 pounds is applied to the seat. If this weight (140 lbs.) is multiplied by 45,000 seats in a stadium, the result is 6,300,000 pounds of force.

If the distance between a person's knees and hips is 18 inches, this is the approximate distance a person's weight travels during the act of sitting. Therefore, 6,300,000 pounds of force is applied for a distance of about 18 inches. This occurs if the people in the stadium sit down once. During an exciting event, many people will stand up and sit down many times, e.g. 10-20 times. The resulting foot-pounds is converted to electrical energy which is used for different things. One example is lighting up lights, signs, or scoreboards around the stadium. Another example is powering electrical necessities in the stadium.

Another embodiment of the present invention utilizes the generated electricity for entertainment purposes. Fans in certain stadium sections of the stadium compete with fans in other sections to see who can generate the most electricity which can be displayed visually or broadcast audibly with the amount of signage illuminated or the brightness or the audible volume, related to the amount of electricity generated. As used herein, the term arena is used to include venues such as stadiums, theaters, and or other venues comprising a large number of seats, e.g., 50 or more seats.

Figure 1:
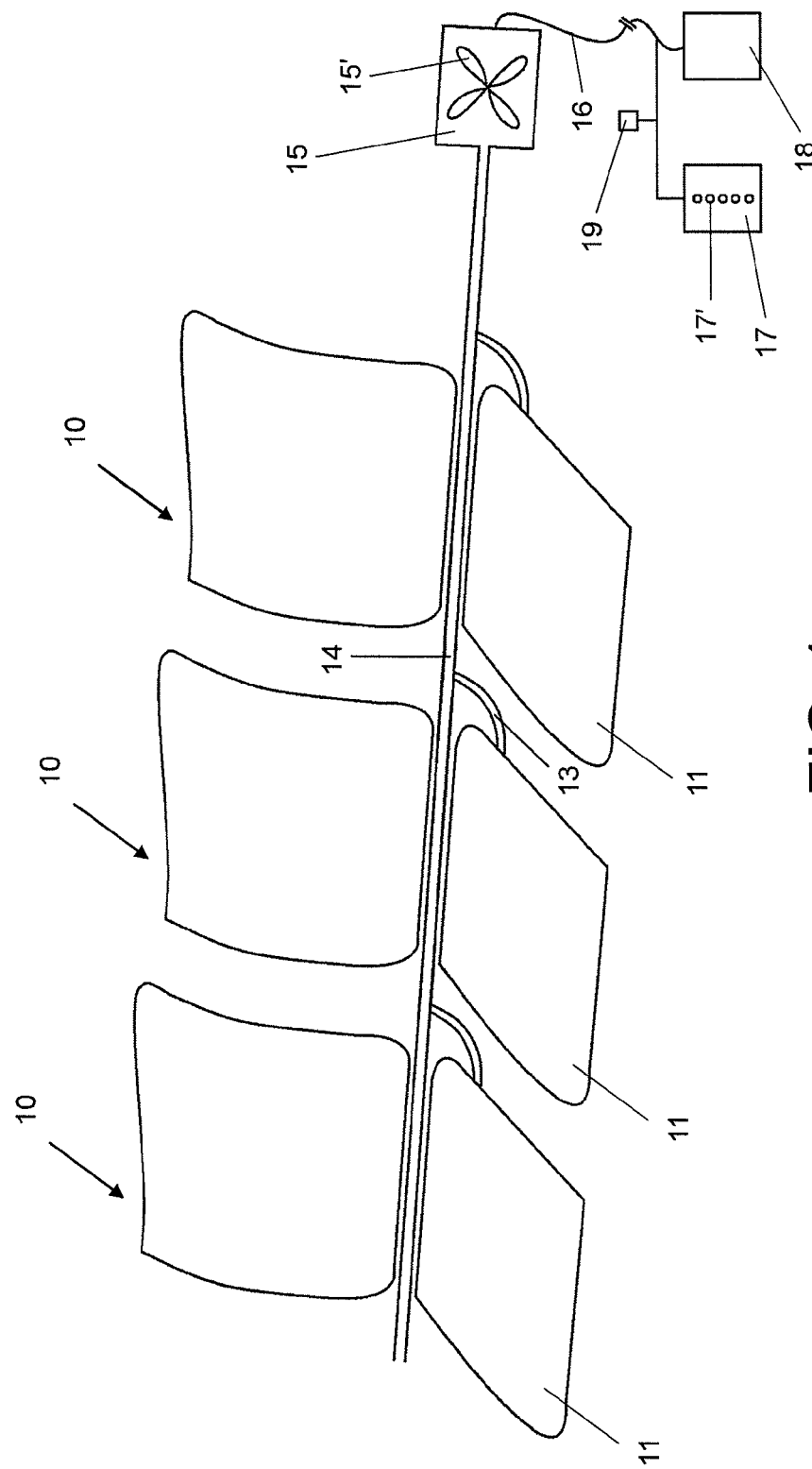
FIG. 1 illustrates a plurality of seats according to one embodiment of the present invention.

With reference to FIG. 1, the electricity generated by electrical generator 15 can be directed to one or more discernible signal generators 17 and 18. In this illustrated embodiment discernible signal generator 17 provides illumination through a series of lights 17'. Preferably, the number of lights illuminated and/or the brilliance of the illumination corresponds to the amount of electricity generated by one or more electrical generators 15. Discernible signal generator 18 is a speaker which generates sounds. The electricity used to power one or more discernible signal generators can be amplified or otherwise controlled by controller 19 which comprises one or more amplifiers if desired. In this manner, fans can compete to generate greater signals or sound which is broadcast in a manner which indicates which seats have generated more electricity.

The following embodiments illustrate seats which generate electricity individually or collectively. There are many methods to produce electricity from moving mechanical parts. The illustrated embodiments provide just a few examples.

FIGS. 1-3 illustrate one embodiment of the present invention. As illustrated in FIG. 1, seats 10 each comprise a movable base 11. As best shown in FIGS. 2 and 3, the base is pivotal and is connected to a bellows 12. When the seat is in the raised position as in FIG. 2, the bellows 12 is expanded. When a person sits or otherwise applies force to base 11 in the generally downward direction, the bellows 12 is compressed forcing air through tube 13 into conduit 14. Suitable one-way valves, not shown, control the flow of air according to this embodiment of the present invention in order to always direct the air out of the bellows through tube 13 and into conduit 14 which is connected to an electrical generator 15. Though not illustrated in FIGS. 2 and 3, tube 13 is connected to bellows at connection point 13'. The pressurized air entering conduit 14 causes a turbine 15' in electrical generator 15 to spin thereby generating electricity which, according to this embodiment, is transferred to one or more devices via electrical conductor 16.

FIG. 4 illustrates an alternative embodiment of the present invention wherein each seat 20 is connected to an individual electrical generator 25 which generates electricity which is transmitted through conductors 26 to a common conductor 28.

FIG. 5 illustrates an alternative embodiment of the present invention wherein a seat base 31 is connected to a bellows 32. This embodiment comprises a sub-base 33 and a plurality of springs 34 which is connected to a turbine 36 in an electrical generator 35. According to this embodiment of the present invention, springs 34 return base 31 to a storage position. According to this embodiment of the present invention turbine 36 is caused to spin in both directions, i.e., both clockwise and counterclockwise, as base 31 is moved downwardly and upwardly, respectively, in order to generate electricity when base 31 is moving in either of two directions. As in the embodiments described above, electrical generator 35 is connected to a desired device or signal generator, e.g., a discernible signal generator.

While the embodiments illustrated in FIGS. 1-5 utilize pneumatic forces, it is also within the scope of the present invention to use hydraulic forces. From the present description, it will be appreciated that the particular form of electrical generator can vary and that one or more different types of electrical generators can be used within the scope of the present invention.

FIGS. 6-14 illustrate a base of a fourth embodiment of the present invention comprising a flywheel. FIGS. 6-14 illustrate a series of views of a base, namely, a side view, a front perspective view and a top view of the base in an upright or storage position, a lowered position, and a lowered position wherein the flywheel had been caused to spin. According to this embodiment of the present invention a base 41 comprises a flywheel 42 comprising ratchet teeth 43. The base also comprises a spring actuated drive mechanism comprising a rotatable but linearly stationary spring support 44 connected to one end of compression spring 45. Spring support 44 comprises a trip pin 46. Connected to the other end of the compression spring 45 is a rotationally stationary but linearly movable spring support 47 which is movable along the longitudinal axis of pivotal support 50. According to this embodiment of the present invention, when base 41 is lowered from the raised position shown in FIGS. 6-8, spring 45 is compressed between spring supports 44 and 47 thereby exerting an outwardly directed force on spring support 47. Spring support 47 comprises an engagement member which is positioned between the ratchet teeth 43 of flywheel 42 as the base is lowered to its lower position. Also, as base 42 is lowered to its lowest position, trip pin 46 trips a release (not shown) which allows spring support 47 to slide linearly and axially along pivotal support 50 thereby driving flywheel 42. This flywheel 42 has magnets which will spin around a coiled wire to generate electricity or is connected to another type of generator (not shown).

FIGS. 15 through 19 each illustrate a series of movements of a seat or the base portion of a seat. The movement can be caused by the downward movement of the mass of a person. Each of FIGS. 15-19 comprises a series of schematics. Each individual schematic comprises two lines. The line of the left illustrates the backrest of a seat while the line to the right illustrates the base portion of the seat on which a person sits. The portion of the seat on which a person's buttocks will rest is referred to herein as the base, in order to distinguish it from the entire seat which includes a base, a backrest and preferably armrests.

Figure 15:
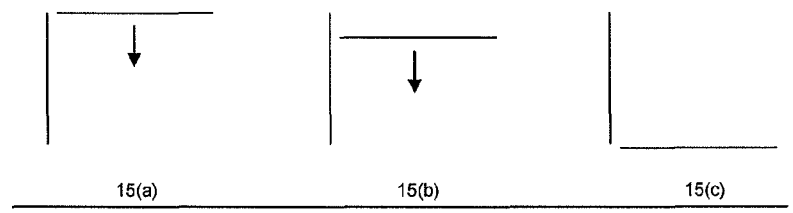
FIGS. 15-19 are schematic views of movable bases of alternate embodiments of the present invention.

With reference to FIG. 15, the base of the seat is normally biased upwardly, e.g. by a spring. The weight of a person will move the base from the position shown in FIG. 15(a) downwardly through the position illustrated in FIG. 15(b) to the final position shown in FIG. 15(c).

Figure 16:
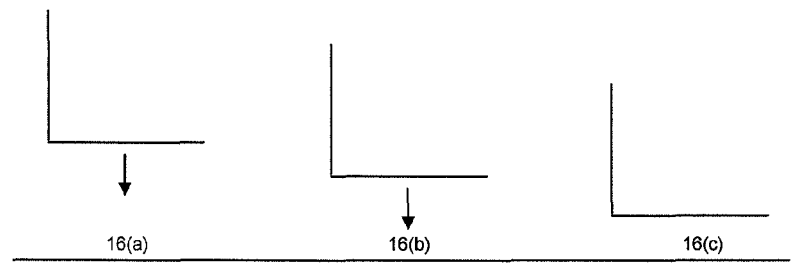

With reference to FIG. 16, the backrest and base move downwardly together from a position shown in FIG. 16(a) to the position shown in FIG. 16(c).

Figure 17:
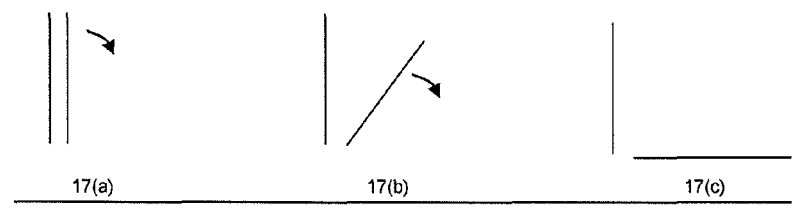

FIG. 17 illustrates an embodiment more similar to a conventional arena or stadium seat wherein the base pivots downwardly. It will be appreciated that the spacing between the base and the backrest is usually sufficient for a person to position at least part of his buttocks on the base to apply weight and downward force to the base thereby moving the base from the position generally illustrated in FIG. 17(a) through the position shown in FIG. 17(b) to the final position shown in FIG. 17(c).

Figure 18:
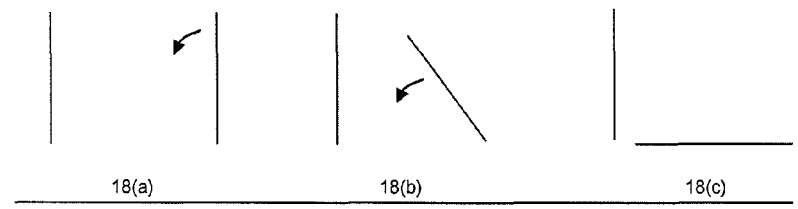

FIG. 18 illustrates an alternative embodiment wherein the base is pivoted about an axis located forwardly whereby the seat pivots downwardly and rearwardly toward the backrest when a person's weight is applied.

Figure 19:
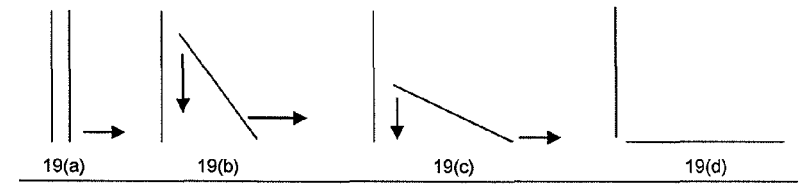

FIG. 19 illustrates an embodiment wherein the base moves both downwardly and slide forwardly from the position shown in FIG. 19(a) through the positions shown in FIGS. 19(b) and 19(c) to the final position shown in FIG. 19(d).

What is claimed is:

1. A plurality of seats, each of said seats comprising a back rest and a movable base;
    at least one electrical generator;
    means connected to said movable base for transferring at least a portion of the force applied to said base during movement to said electrical generator;
    a discernible signal generator;
said electrical generator is connected to said discernible signal generator and said discernible signal generator generates a signal which corresponds to the amount of electrical power generated by at least one of said electrical generators.

2. A plurality of seats according to claim 1 wherein said discernible signal generator generates a signal which corresponds to the amount of electrical power generated by a plurality of electrical generators.

3. A plurality of seats according to claim 1 wherein said discernible signal generator emits an audible signal.

4. A plurality of seats according to claim 1 wherein said discernible signal generator generates a visible signal.

5. A plurality of seats according to claim 3 wherein said discernible signal generator generates a visible signal.

6. A plurality of seats according to claim 1 wherein said base is pivotally movable relative to said backrest.

7. A plurality of seats according to claim 1 wherein said transferring means comprises a compressible spring.

8. A plurality of seats according to claim 1 wherein said transferring means comprises a fly wheel.

9. A plurality of seats according to claim 1 wherein said transferring means comprises an air compressor.

10. A plurality of seats according to claim 9 wherein said transferring means comprises a turbine.

11. A plurality of seats according to claim 1 wherein said transferring means comprises a hydraulic pump.

12. A plurality of seats according to claim 1 wherein a plurality of seats are operatively connected to a single electrical generator.

13. A plurality of seats according to claim 1 wherein a plurality of seats are each operatively connected to different electrical generators.

14. A plurality of seats according to claim 1 wherein said bases are positionable in a storage position and said seats further comprise means for biasing said bases toward said storage position.

15. An arena comprising a plurality of seating sections each comprising a plurality of seats
    each of said seats comprising a back rest and a movable base;
    at least one electrical generator;
    means connected to said movable base for transferring at least a portion of the force applied to said base during movement to said electrical generator, said generator is connected to a discernible signal generator, wherein different discernible signals are generated corresponding to the amount of electrical power generated by at least one of said electrical generators connected to seats in different sections of the arena.

16. An arena comprising a plurality of seating sections according to claim 15 wherein said discernible signal generator generates a signal which corresponds to the amount of electrical power generated by a plurality of electrical generators.

\* \* \* \* \*